(12) United States Patent
Giese et al.

(10) Patent No.: US 6,812,952 B2
(45) Date of Patent: Nov. 2, 2004

(54) PLATEN FINGER ASSEMBLY FOR AN INTERNAL DRUM SCANNER

(75) Inventors: Troy A. Giese, Hugo, MN (US); James R. Gilbertson, Oakdale, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/376,964

(22) Filed: Feb. 28, 2003

(65) Prior Publication Data

US 2004/0169721 A1 Sep. 2, 2004

(51) Int. Cl.$^7$ ................................................ B41J 11/10
(52) U.S. Cl. ...................................... 347/264; 347/262
(58) Field of Search ............................... 347/262, 264, 347/215, 218, 221; 346/138

(56) References Cited

U.S. PATENT DOCUMENTS

| | | | |
|---|---|---|---|
| 5,436,695 A | * | 7/1995 | Lucking et al. ............. 346/138 |
| 5,956,071 A | | 9/1999 | Mattila et al. .............. 347/262 |
| 6,342,914 B1 | | 1/2002 | Johnson et al. ............. 347/262 |

* cited by examiner

Primary Examiner—Huan Tran
(74) Attorney, Agent, or Firm—William F. Noval

(57) ABSTRACT

In an internal drum scanner assembly having a curved platen for supporting media during exposure by a laser image scanner, media positioning apparatus comprising: a media feed device for feeding media onto the curved platen; and an assembly for pushing the media out of the feed device into the scanning region of the platen so that a borderless image can be produced on the media.

10 Claims, 14 Drawing Sheets

PLATEN FINGER ASSEMBLY FOR AN INTERNAL DRUM SCANNER

FIELD OF THE INVENTION

This invention relates in general to internal drum scanner assemblies and laser imaging systems incorporating such scanner assemblies. In particular, the present invention relates to a mechanism for aligning film into a scanning position in an internal drum type scanner assembly, suitable for use in a medical imaging system, where the entire film is accessible to a laser so that borderless images can be produced.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and control subsystems for coordinating the operation of the laser imager and the film processor.

The digital image data is a sequence of digital image values representative of the scanned image. Image processing electronics within the control subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a full image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

The film may be fed onto the film platen utilizing a film transport system which often incorporates a plurality of feed rollers. Once the piece of photosensitive film is fed onto the film platen, the film must be held tight against the curved surface of the film platen, and centered and aligned into a scanning position in order for an image to be correctly exposed onto the photosensitive film. Any skew of the film must also be removed. Often such methods and mechanisms for aligning and centering a piece of film on the internal surface of the film platen require multiple complex mechanical and electrical components and control systems.

U.S. Pat. No. 5,956,071, issued Sep. 21, 1999, inventors Mattila et al., and U.S. Pat. No. 6,342,914, issued Jan. 29, 2002, inventors Johnson et al. disclose positioning a film into a scanning position on a curved film platen in an internal drum scanner assembly. After the leading edge of the film is properly positioned, the rear edge is held in the nip of feed rollers during film scanning by a laser. Thus, a narrow border of the film in the film nip cannot be imaged. It is thus desirable to provide an internal drum scanner that can produce a borderless film.

SUMMARY OF THE INVENTION

According to the present invention, there is provided a solution to these problems.

According to a feature of the present invention, there is provided in an internal drum scanner assembly having a curved platen for supporting media during exposure by a laser image scanner, media positioning apparatus comprising: a media feed device for feeding media onto said curved platen; and an assembly for pushing said media out of said feed device into the scanning region of said platen so that a borderless image can be produced on said media.

ADVANTAGEOUS EFFECT OF THE INVENTION

The invention has the following advantages.

1. An internal drum scanner assembly is provided that can produce a borderless film.

DETAILED DESCRIPTION OF THE INVENTION

Figure 12:
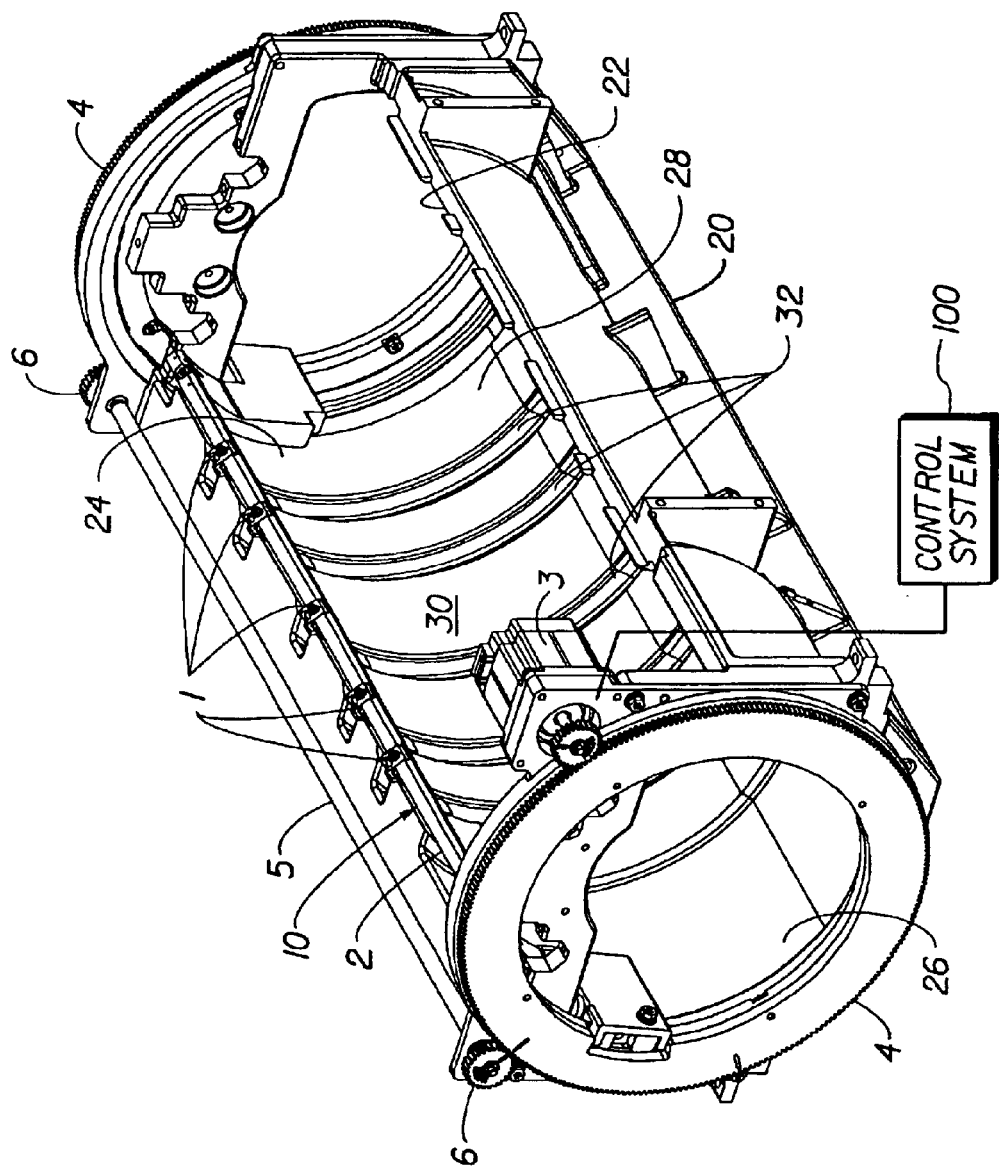
FIG. 12 is a rear isometric view of an internal drum assembly.

FIG. 12 is a rear isometric view of internal drum assembly including a film platen 20 and platen registration bar assembly 10, a bar 2 attached to a pair of large gears 4 and five independently spring-loaded sliders 1. A geared motor 3 actuated by control system 100 locates the bar by rotating the large gears, synchronized with a pair of gears 6 attached to a rod 5. Assembly 10 is able to deskew films ranging in lengths from 18 cm. to 43 cm. and in widths of both 25 cm. and 36 cm.

Assembly 10 is mounted for movement on a horizontally oriented concave curved film platen 20 having first and second horizontal edge regions 22, 24 and third and fourth curved side regions 26, 28 connected between said first and second edge regions 22, 24. The concave, curved film platen has a curved surface 30 defining a film path from first edge region 22 to second edge region 24. Platen 20 is preferably cast aluminum and has arcuate slots 32 in which said sliders 1 are slidably mounted. When a film is fully positioned on platen 20 bar 2 and sliders 1 establish the location of the leading edge of the film.

Figure 1:
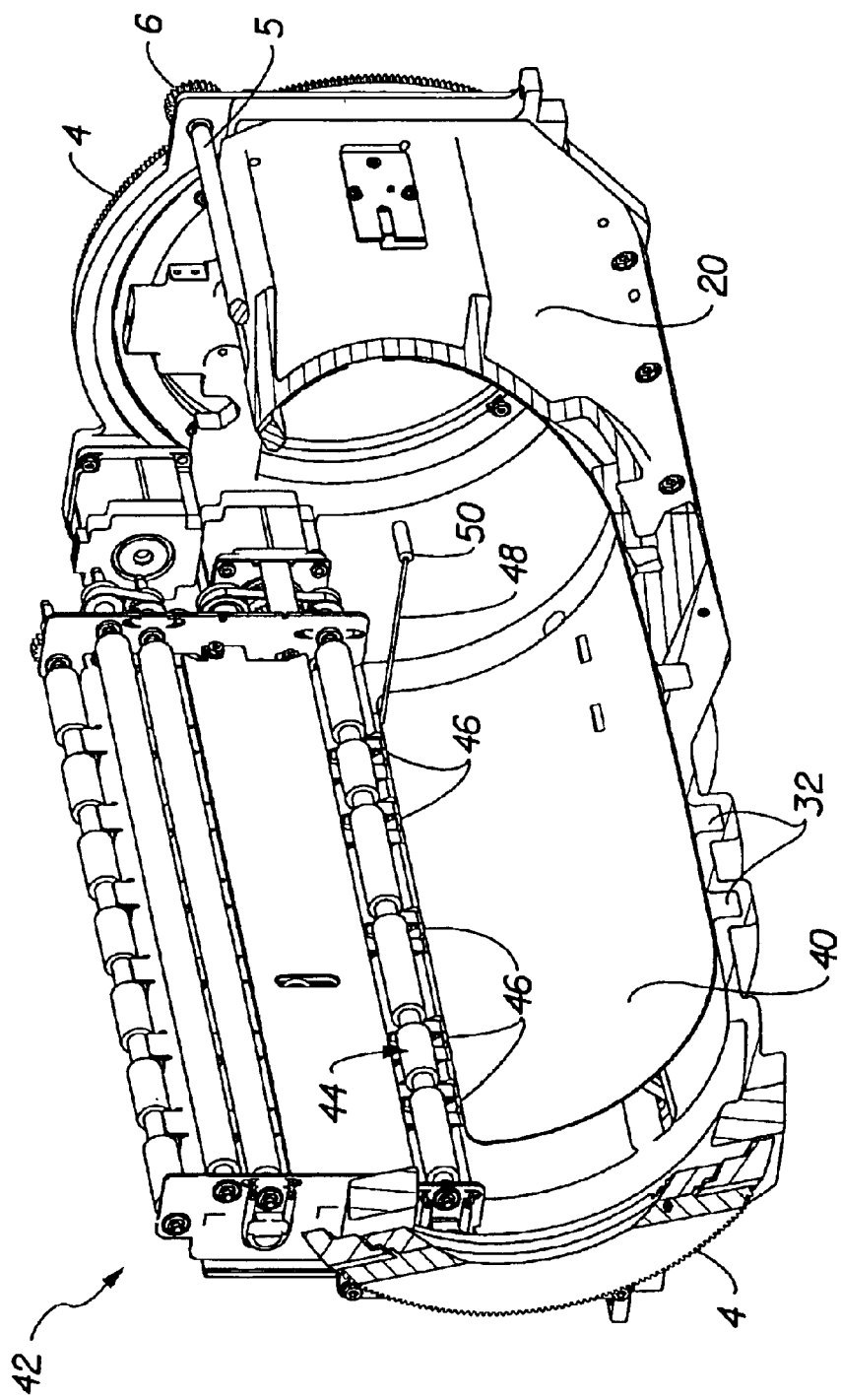
FIG. 1 is a front isometric view of an internal drum assembly including the present invention.

Referring now to FIG. 1, there is shown the internal drum assembly of FIG. 12 form the front and including an embodiment of the present invention. As shown, a film 40 has been positioned on curved platen 20 by film (media) feed device 42 which includes feed roller set 44 and independently spring loaded fingers 46. As will be described in greater detail below, fingers 46 have been rotated into the film path and moved vertically through segmented roller set 44 to push film 40 into the scanning region of platen 20. Scanning is represented by laser beam 48 which is rotated about axis 50 and translated the length of film 40 to expose film 40 in a raster pattern of a digital image.

Figure 2:
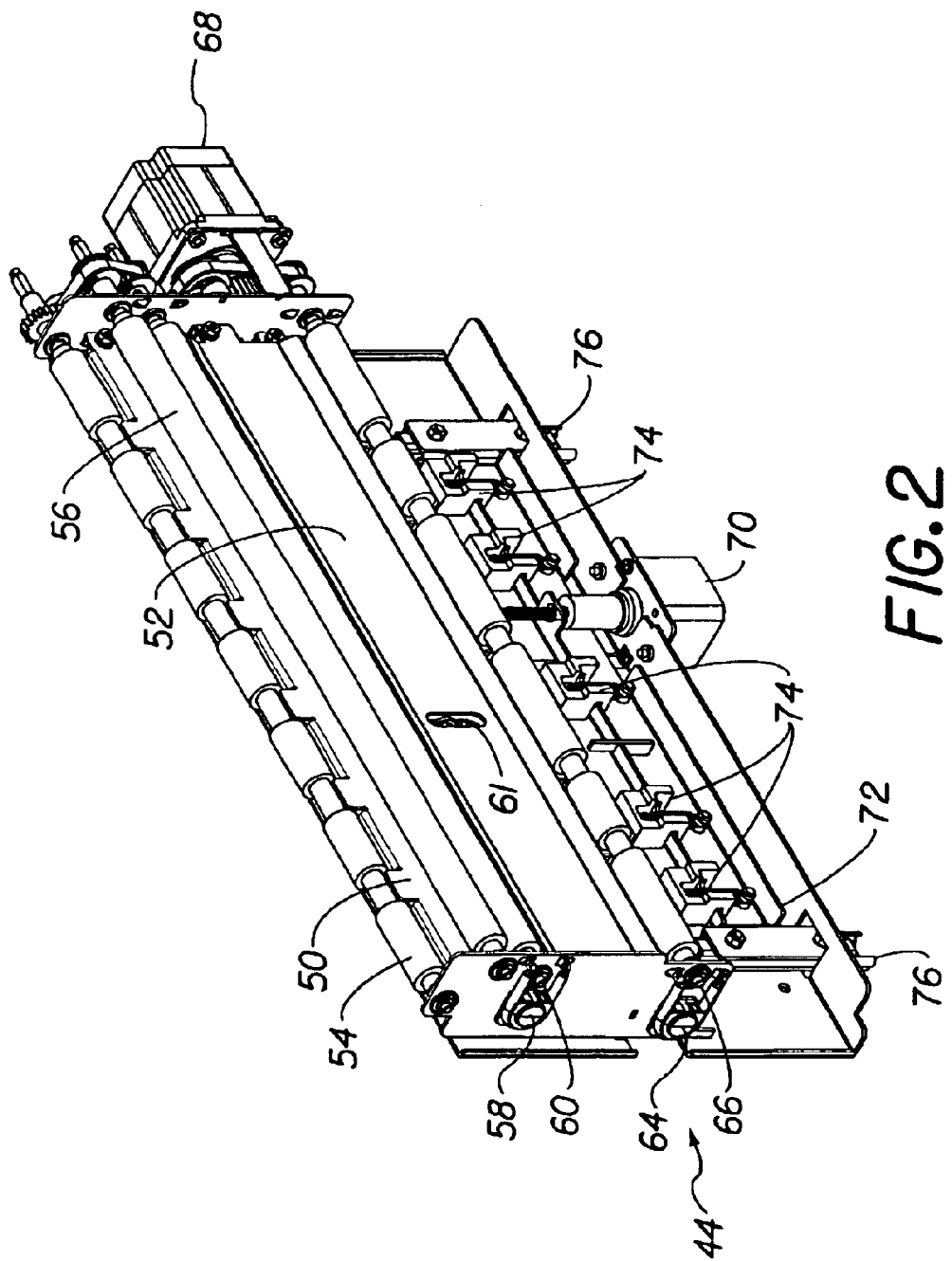
FIG. 2 is a front isometric view of the present invention.

FIG. 2 is an isometric view of film feed device 42 including a platen finger assembly. Film feed device 42 includes leading edge guide 50, film guide 52, segmented drive roller 54, drive roller 56, rollers 58, 60, film position sensor 61, segmented roller set 44 including rollers 64, 66, roller drive stepper motor 68, linear stepper motor 70 coupled to bracket 72. Using a leading edge guide 50 in combination with a solid drive roller 56 acting as an entrance guide reduces the probability of film scratching. A segmented drive roller 54 prevents the trailing portion of the film from slapping the leading edge guide 52 after leaving the vertical transport. The film enters a roller set 58, 60 which is necessary to maintain the roller set pitch required to transport smaller film sizes, and is then constrained by another film guide 52. The two film guides 50, 52 constrain the film path to properly actuate the film position sensor 62 and ensure proper feeding into the segmented roller set 64, 66. The stepper motor 63 driving the rollers stops shortly after the trailing edge of film 40 passes the sensor 61. A linear stepper motor pulls a bracket 72 downward. The bracket 72 interlocks with the finger carriages 74. Drawer slides 76, constrain the bracket's motion vertically.

An important advantage of this invention is the ability to produce a borderless image in a small diameter scanning cylinder by using five independently spring loaded fingers to push the film out of the roller set and into the scanning region of the platen.

Figure 3B:
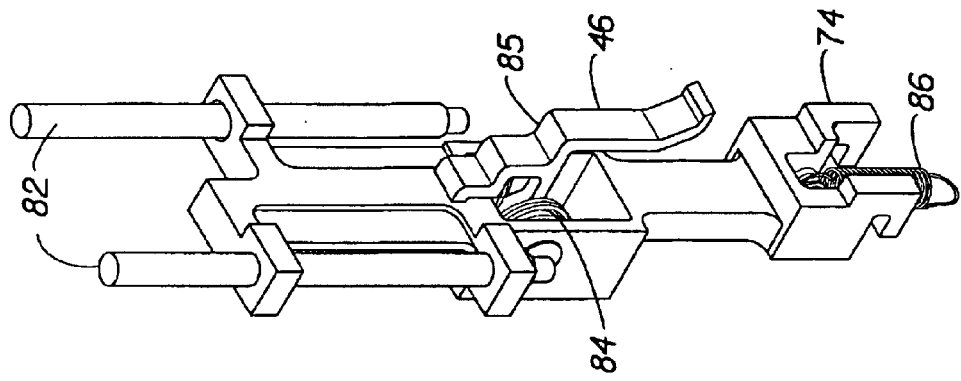
FIGS. 3a and 3b are isometric views of the finger-carriage assembly of the invention of FIG. 1.
Figure 3A:
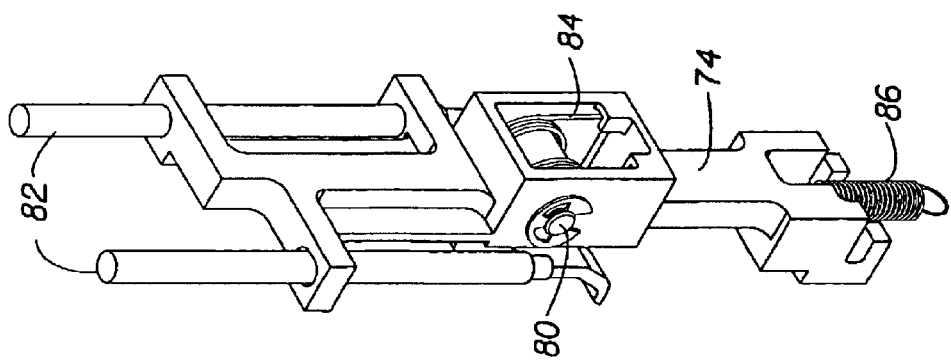

FIGS. 3a and 3b show a platen finger assembly including a finger 46 rotatably mounted on pin 80 of carriage 74. Carriage 74 slides on shafts 82, torsion spring 84 loading the finger 46 against the carriage 74. This spring 84 spring-loads the finger 46 into the film path. The finger 46 rotates about a pin 80. The cam surface 85 on the finger serves to rotate the finger 46 out of the film path at the home position. Two shafts 82 constrain each carriage 74 to translate linearly in the vertical direction (parallel to the film path). An extension spring 86 provides the independent spring-loading aspect of the mechanism. This spring 86 acts as a tolerance accumulator, allowing all the intended fingers 46 (number depends on film width) to apply pressure to the film.

Figure 4:
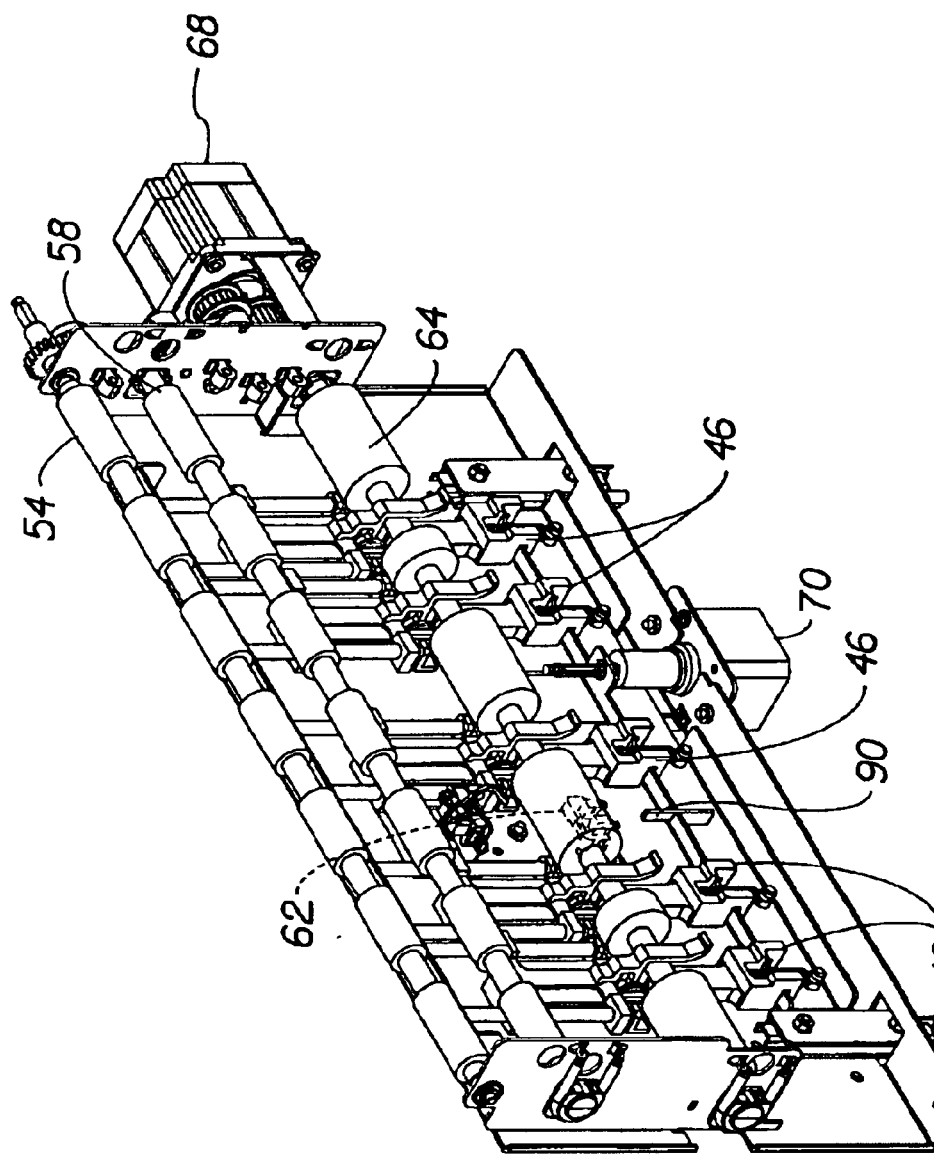
FIG. 4 is an isometric view of the present invention excluding film guides and some rollers to show internal components.

FIG. 4 shows the platen finger assembly without the film guides and some of the rollers. The bottom segmented idler roller 64 has a larger diameter to allow the fingers 46 to pass through the segmented regions as shown. The fingers 46 rotate out of the film path when the flag 90 interrupts the finger home sensor 62.

Figure 5:
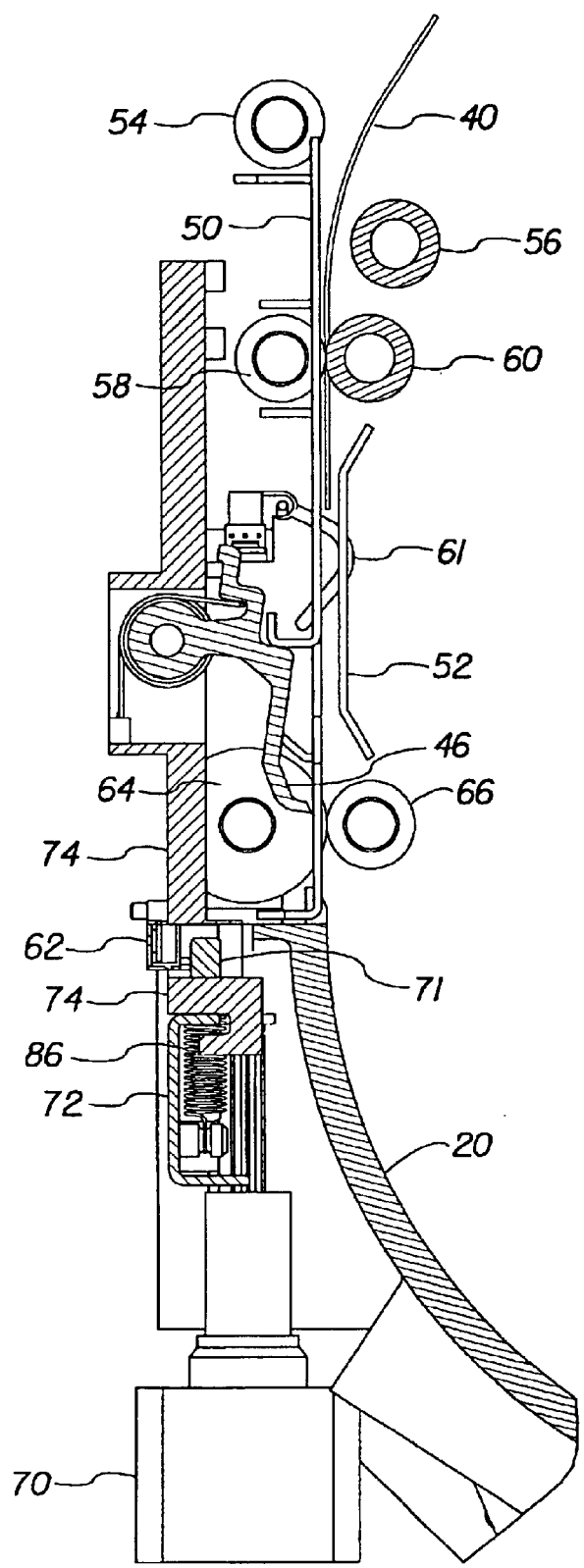
FIG. 5 is a cross-sectional elevational view of the present invention with film entering.

The platen finger assembly operates using one rotational stepper 68 to turn the rollers, one linear stepper 70 to actuate the fingers, and two sensors 61, 62 (one 61 for film detection and one 62 for finger position). The sequence of operations begins with input from software indicating a film is approaching the platen as a result of a signal from sensor 61. The rotational stepper motor 68 turns the rollers with a tangential velocity of, for example 20 inches per second. FIG. 5 shows a cross-sectional view of the platen finger assembly with a film 40 approaching the film position sensor 61. The entrance guide roller 56 ensures a scratch free handoff between the vertical assembly and the platen 20. The linear stepper motor 70 holds the fingers 46 in the home position, indicated by the flag 71 attached to the bracket 72 blocking the optical sensor 62. As mention earlier, carriages 74 interlock with the bracket 72 and transport the fingers 46, which are spring loaded with torsion springs 74. The fingers 46 are in the home position, which is outside of the film path, behind the film guide.

Figure 6A:
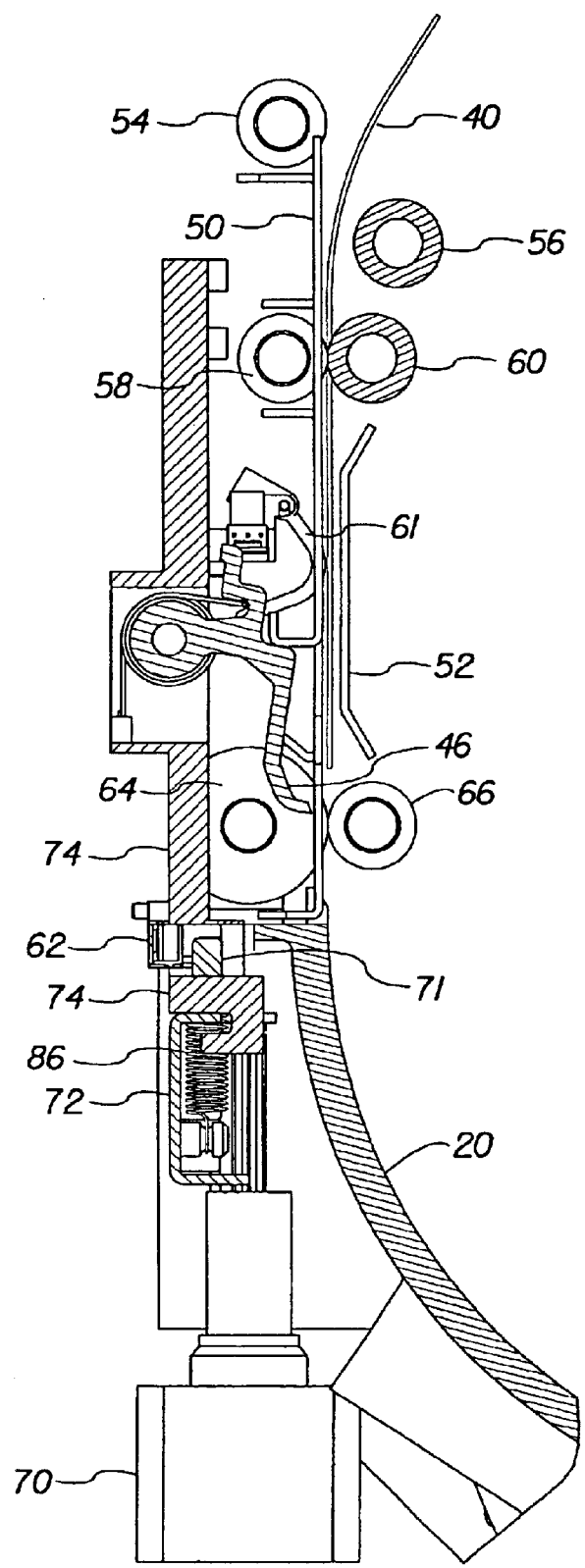
FIGS. 6a and 6b are a cross-sectional elevational views of the present invention with film passing the film position sensor.
Figure 6B:
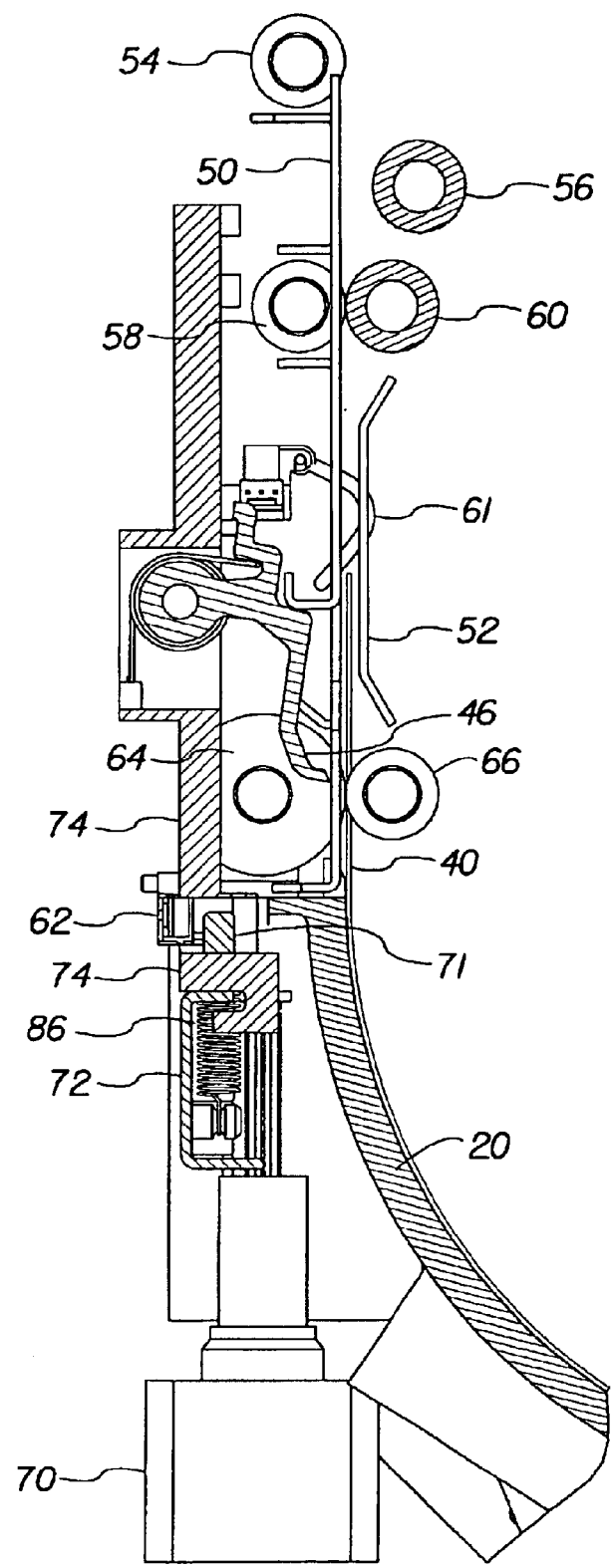
Figure 7:
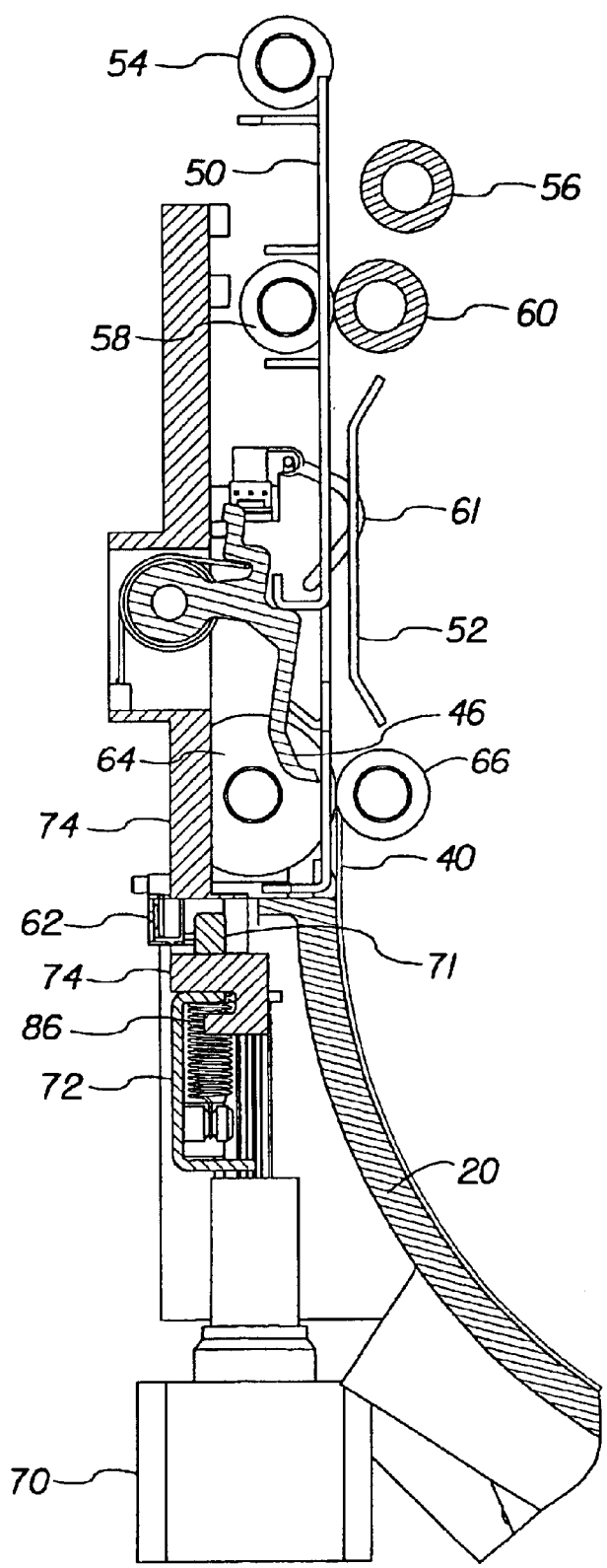
FIG. 7 is a cross-sectional front view of the present invention with the trailing edge of the film at the last roller set.

The film 40 is actuating the film position sensor 62 in FIG. 6a. The exit guide roller 54 prevents the tail edge of the film from slapping against a sheet metal edge or bend, which helps eliminate scratches on the film surface. The rollers continue to turn as software waits for the film 40 to clear the film position sensor 61, see FIG. 6b. Control system 100 continues to turn the rollers until the trailing edge reaches the last roller set 64, 66 based on timing, see FIG. 7. The sequence of operations and timing used to determine trailing edge placement in the roller set 64, 66 is independent of film size, since the film position sensor 61 checks for the trailing edge of the film 40.

Figure 8A:
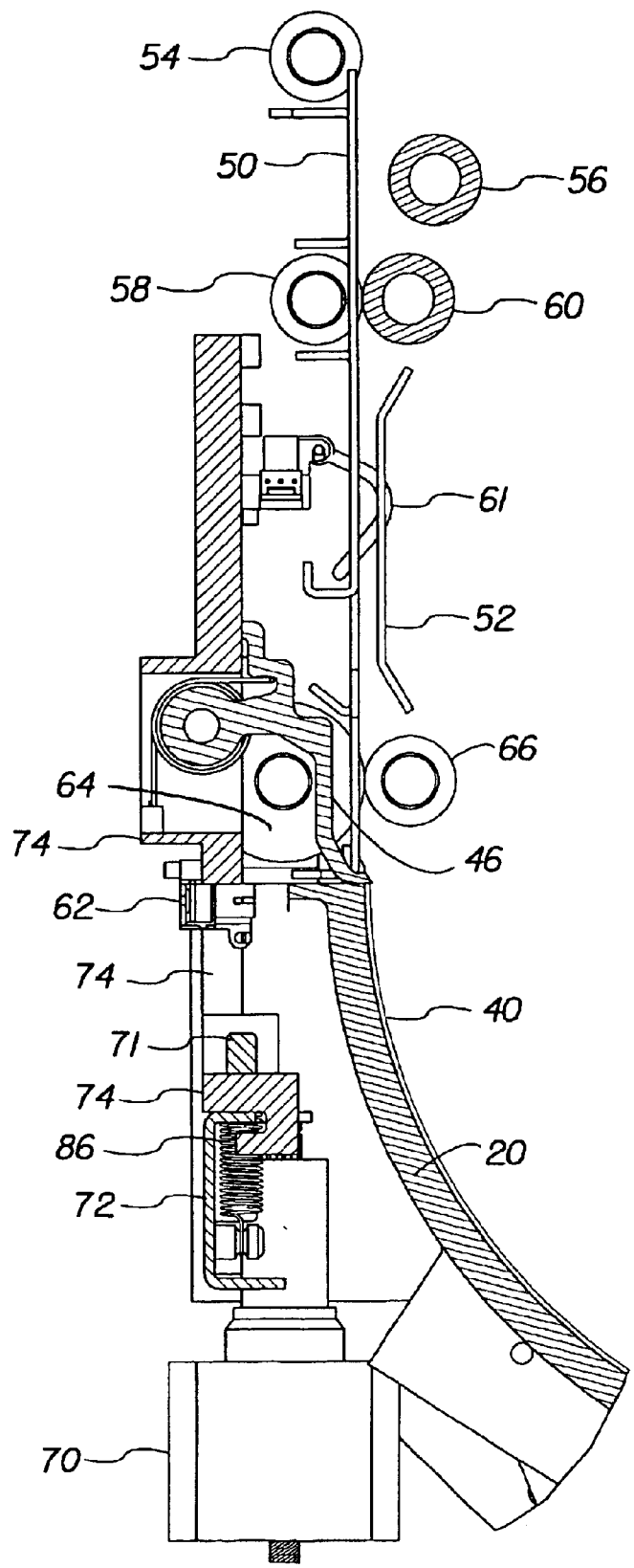
FIGS. 8a and 8b are cross-sectional elevational views of the present invention with the fingers pushing the film into the imaging region of the cylinder.
Figure 8B:
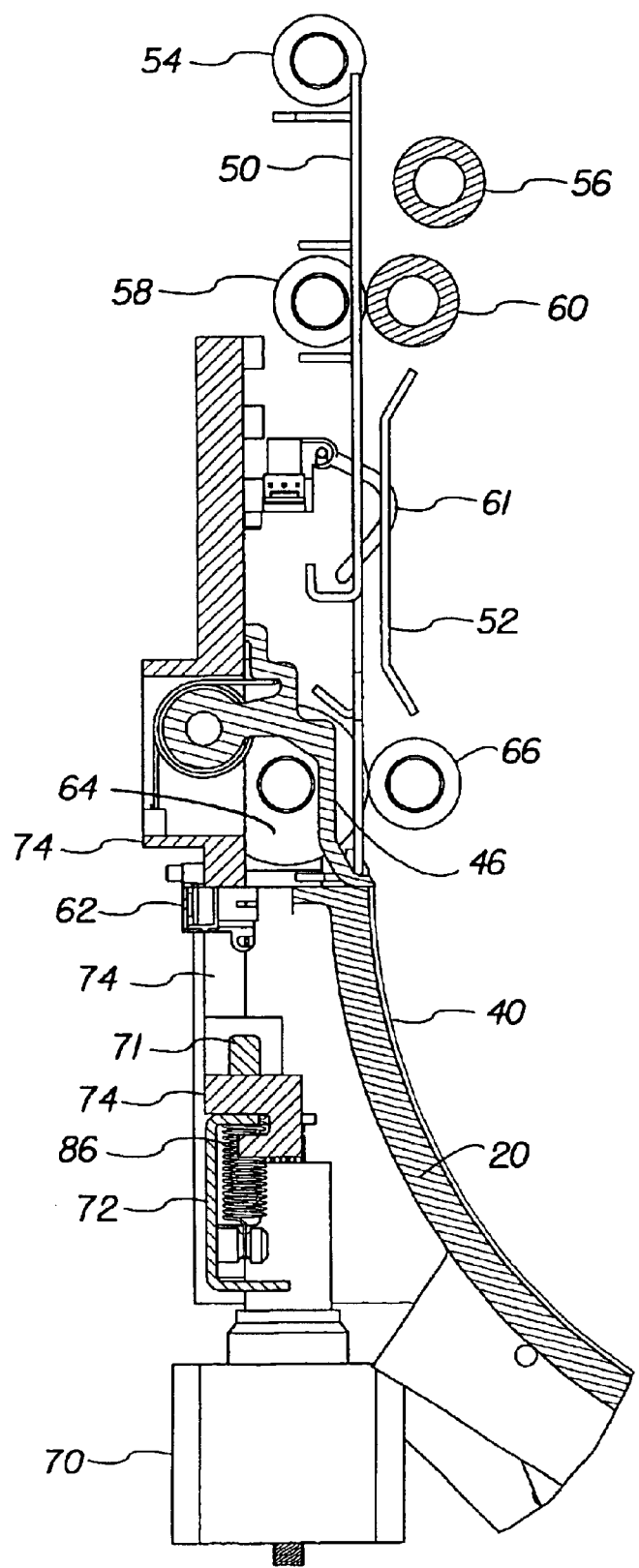

The rollers 64, 66 stop turning and the linear stepper motor 70 moves the finger-carriages 74 downward, such that the fingers 46 rotate into the film path and the bottom surface of fingers 46 is perpendicular to the film 40 as depicted in FIG. 8a. The linear stepper motor 70 continues to pull the fingers 46 downward, which travel linearly without further rotation, and the fingers 46 register with the platen 40 surface as shown in FIG. 8b pushing film 40 out of the nip of rollers 64, 66 so that film 40 can be exposed to a borderless image.

Figure 9:
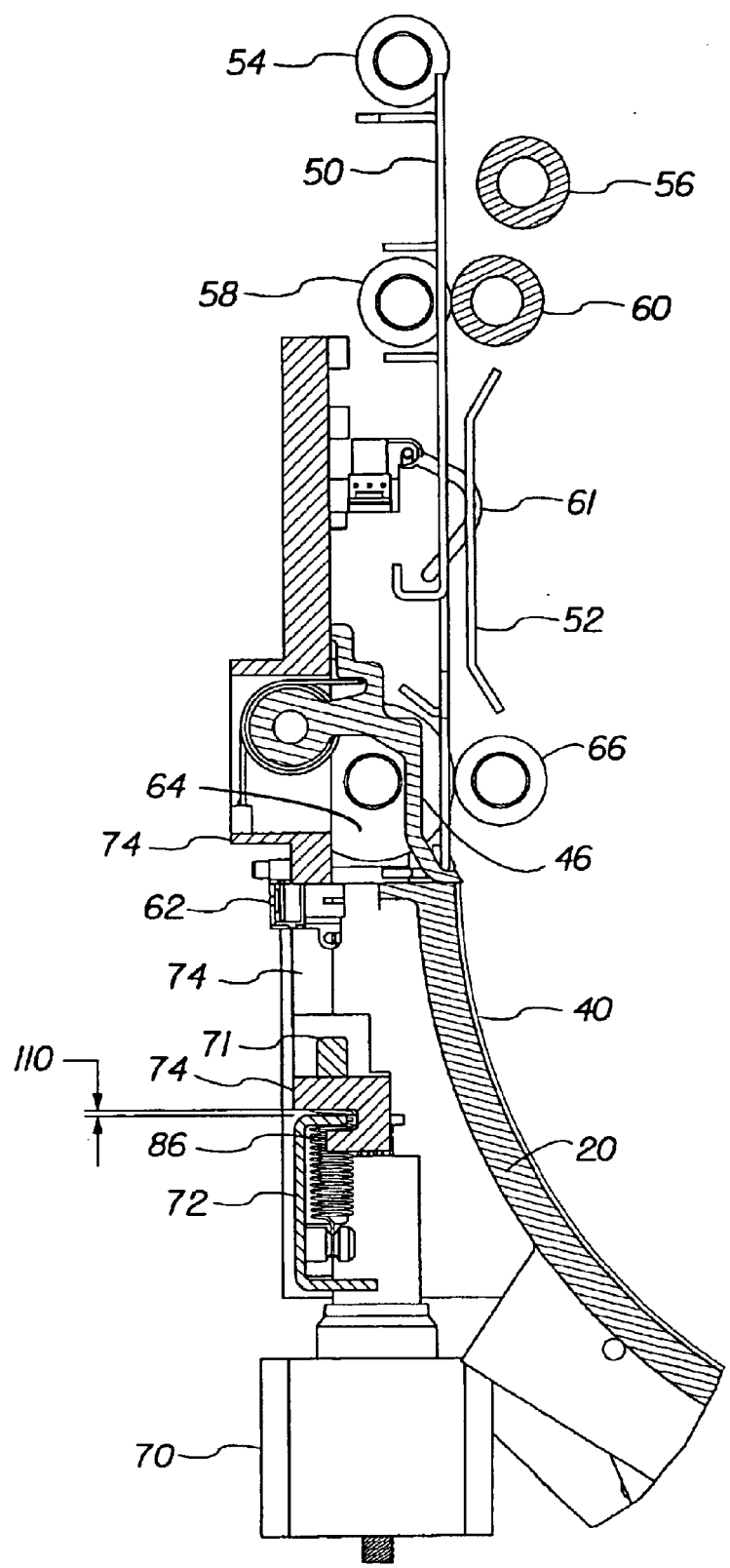
FIG. 9 is a cross-sectional elevational view of the present invention demonstrating the finger motor over travel.

The linear stepper motor 70 has a small over travel, which allows each finger 46 to individually register to the platen 40 surface (via the spring loaded constraint with the bracket 74). The gap 110 in FIG. 9 occurs as the bracket 74 continues to travel downward after the finger registers with the platen surface. This additional travel made by the bracket 74 is possible with the use of the use of the extension springs 86.

Figure 10A:
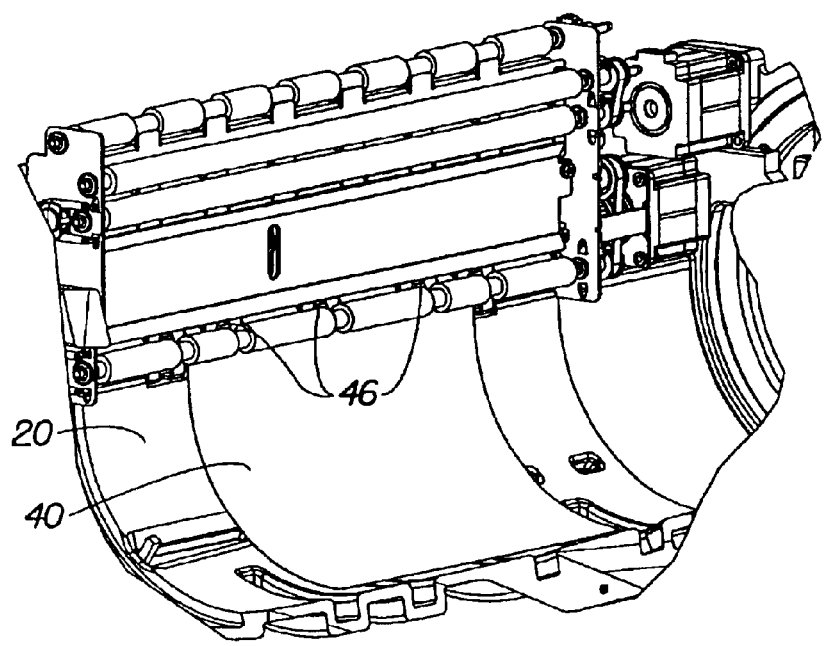
FIGS. 10a and 10b are isometric views of the present invention showing the operation for one size film.
Figure 10B:
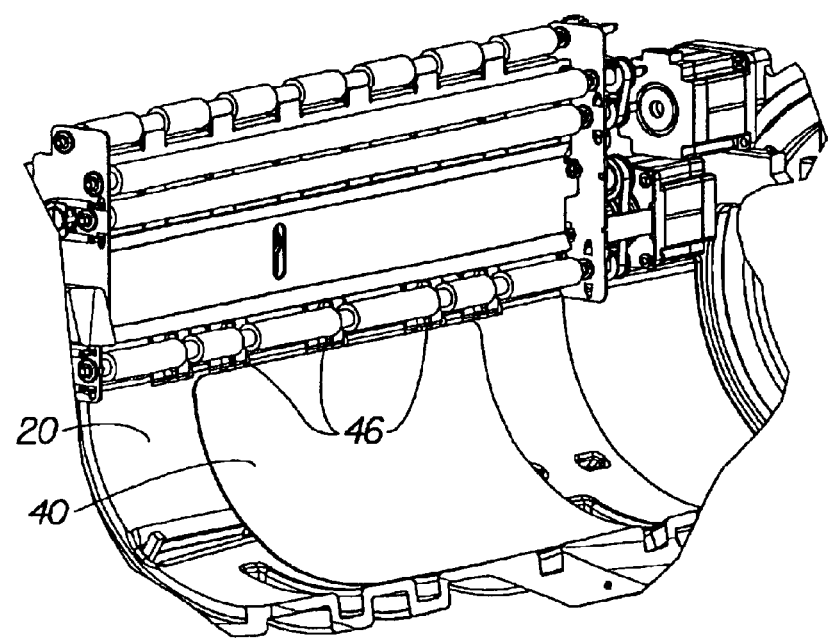
Figure 11A:
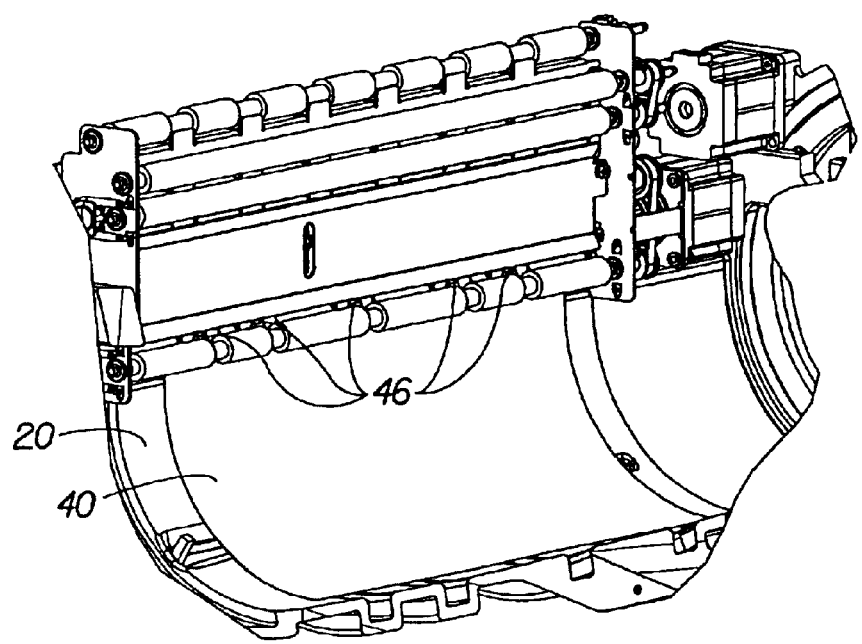
FIGS. 11a and 11b are isometric views of the present invention showing the operation for another size film.
Figure 11B:
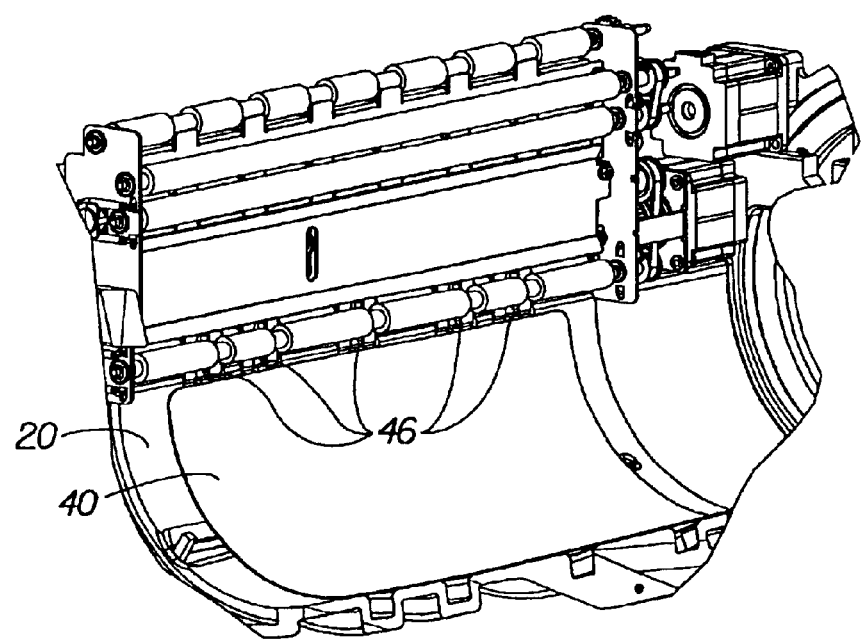

The platen finger assembly contains five fingers 46 in an attempt to apply a distributed force to the trailing edge of the film 40. Experimental results indicated that a solid finger across the entire trailing edge of the film is optimal and support is required near the corners. This design ensures that there are at least three fingers 46 on each film size, one in the middle and near each corner. All five fingers 46 engage the film for film widths of 36 cm for example. FIG. 10 shows the operation for 25 cm film for example, and FIG. 11 for 36 cm wide film, for example.

The invention has been described in detail with particular reference to certain preferred embodiments thereof, but it will be understood that variations and modifications can be effected within the spirit and scope of the invention.

PARTS LIST

| | |
|---|---|
| 1 | spring-loaded sliders |
| 2 | bar |
| 3 | geared motor |
| 4 | pair of large gears |
| 5 | rod |
| 6 | pair of gears |
| 10 | platen registration bar assembly |
| 20 | curved film platen |
| 22,24 | first and second edge regions |
| 26,28 | third and fourth edge regions |
| 30 | curved surface |
| 32 | arcuate slots |
| 40 | film (media) |
| 42 | film (media) feed device |
| 44 | feed roller set |
| 46 | fingers |
| 48 | laser beam |
| 50 | leading edge guide |
| 52 | film guide |
| 54 | segmented drive roller |
| 56 | drive roller |
| 58,60 | rollers |
| 61 | film position sensor |
| 62 | finger position sensor |
| 64,66 | rollers |
| 68 | roller drive stepper motor |
| 70 | linear stepper motor |
| 72 | bracket |
| 74 | finger carriage |
| 76 | drawer slides |
| 80 | pin |
| 82 | shaft |
| 85 | cam surface |
| 86 | extension spring |
| 90 | flag |
| 100 | control system |
| 110 | gap |

What is claimed is:

1. In an internal drum scanner assembly having a curved platen for supporting media in a scanning region of said platen during exposure of said media by a laser image scanner, media positioning apparatus comprising:

a media feed device located adjacent to the scanning region of said platen for feeding media onto said curved platen such that a trailing edge of said media is located in said device; and an assembly associated with said media feed device for pushing said media out of said feed device into said scanning region of said platen so that said trailing edge of said media is no longer located in said device.

2. The apparatus of claim 1 wherein said media feed device includes a pair of rollers which feed said media onto said curved platen such that said trailing edge of said media is located in the nip of said rollers and said assembly pushed media out of said nip into said scanning region of said platen.

3. The apparatus of claim 1 wherein said assembly includes a plurality of platen finger assemblies which engage said trailing edge of said media to push said media into the scanning region of said platen.

4. The apparatus of claim 3 wherein said plurality of platen finger assemblies include a smaller subset of said assemblies which engage media of a first dimension and either said plurality of or a larger subset of said assemblies which engage media of a second larger dimension.

5. The apparatus of claim 2 wherein said assembly includes a plurality of platen finger assemblies which engage said trailing edge of said media to push said media into the scanning region of said platen.

6. The apparatus of claim 5 wherein each of said platen finger assemblies includes a spring loaded finger which is held out of said media path as said media is fed onto said curved platen, and is biased into said media path after passage of said media to engage the trailing edge of said media.

7. The apparatus of claim 6 including an assembly for simultaneously moving said platen finger assemblies in a vertical direction to push said media out of the nip of said rollers.

8. The apparatus of claim 6 wherein said rollers are segmented to allow said fingers to pass through said rollers.

9. In an internal drum scanner assembly having a curved platen for supporting media during exposure of said media by a laser image scanner, media positioning apparatus comprising:

a media feed device for feeding media onto said curved platen, said media feed device including a pair of rollers which feed said media onto said curved platen; and an assembly for pushing said media out of said media feed device into said scanning region of said platen, wherein a trailing edge of said media is located in the nip of said rollers and said assembly pushes said media out of said nip into said scanning region of said platen.

10. In an internal drum scanner assembly having a curved platen for supporting media during exposure of said media by a laser image scanner, media positioning apparatus comprising:

a media feed device for feeding media onto said curved platen; and an assembly for pushing said media out of said feed device into said scanning region of said platen, wherein said assembly includes a plurality of platen finger assemblies which engage a trailing edge of said media to push said media into the scanning region of said platen.

* * * * *